(12) United States Patent
Kakehi

(10) Patent No.: US 7,219,415 B2
(45) Date of Patent: May 22, 2007

(54) METHOD OF MANUFACTURING THIN FILM MAGNETIC HEAD

(75) Inventor: Masahiro Kakehi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 10/631,624

(22) Filed: Jul. 31, 2003

(65) Prior Publication Data
US 2004/0020029 A1 Feb. 5, 2004

(30) Foreign Application Priority Data
May 8, 2002 (JP) .............................. 2002-226815

(51) Int. Cl.
*G11B 5/127* (2006.01)
*H04R 31/00* (2006.01)

(52) U.S. Cl. .............. 29/603.16; 29/603.08; 29/603.15; 29/603.18; 216/39; 216/41; 216/48; 360/126; 360/317; 451/5; 451/41

(58) Field of Classification Search ............ 29/603.08, 29/603.15, 603.16, 603.18; 360/126, 317; 216/39, 41, 48; 427/127, 128
See application file for complete search history.

(56) References Cited

U.S. PATENT DOCUMENTS 4,674,174 A * 6/1987 Kishita et al. .............. 438/572

5,850,325 A * 12/1998 Miyauchi et al. ........... 360/319
6,838,384 B2 * 1/2005 Kamijima .................... 438/702

FOREIGN PATENT DOCUMENTS

| JP | 61011913 A | * | 1/1986 |
| JP | 7-114708 | | 10/1993 |
| JP | 07-114708 A | | 5/1995 |

OTHER PUBLICATIONS

"Highly defined narrow track write heads fabricated by focused ion beam trimming with the A12O3 refilling process"; Ishi, T.; Nonaka, Y.; Matsubara, T.; Ishiwata, N.; Magnetics, vol. 35, Issue 5, part 1, Sep. 1999; pp. 2541-2543.*

* cited by examiner

*Primary Examiner*—Paul D. Kim
(74) *Attorney, Agent, or Firm*—Greer, Burns & Crain, Ltd.

(57) ABSTRACT

The method of manufacturing a thin film magnetic head is capable of precisely forming a core section with preventing the variation of the write-core head caused by ion milling for removing an electric conductive film and capable of improving yield of products. The method of manufacturing a thin film magnetic head, in which a core section having prescribed write-core width is formed by applying ion milling to an upper magnetic pole and a lower magnetic pole, comprises the steps of examining the write-core width of the core section; covering a surface of the core section with a protection film except an electric conductive film for preventing electro static charge of a wafer; and removing the exposed electric conductive film by ion milling.

2 Claims, 4 Drawing Sheets

METHOD OF MANUFACTURING THIN FILM MAGNETIC HEAD

BACKGROUND OF THE INVENTION

The present invention relates to a method of manufacturing a thin film magnetic head, e.g., an induction recording-reproducing thin film magnetic head, a hybrid thin film magnetic head composed of an induction recording head and a magnetoresistance reproducing head, which is used for a magnetic disk drive unit, a magnetic tape recorder, etc., and a magnetic recording-reproducing apparatus.

In an ordinary hybrid MR head (a thin film magnetic head) including an induction recording head and a magnetoresistance reproducing head, a write-head section for induction-recording data is piled on a reproducing head section having a magnetoresistance (MR) element. The structure of the thin film magnetic head is shown in FIGS. 4–6. FIG. 4 is a plan view of the thin film magnetic head; FIG. 5 is a sectional view thereof; and FIG. 6 is a schematic view of a disk-side face thereof.

As shown in FIG. 5, the write-head section has an upper magnetic pole 10 and a lower magnetic pole 12, which mutually faced with a minute gap 5. A coil 14, which is made of an electric conductive material, is formed between the magnetic poles 10 and 12. The lower magnetic pole 12 acts as an upper shielding layer of the reproducing head section. As shown in FIG. 6, a lower shielding layer 18 is provided under an MR element 16.

To improve recording density of a recording medium, track density of the recording medium should be increased. Therefore, width of the write-core section should be made as narrow as possible and as precise as possible. After the upper magnetic pole 10 is formed, the write-core width is determined by ion milling or FIB machining. A sectional shape of the write-core width is examined by SMI test or SEM test. Since a wafer is charged with static electricity during the SMI or SEM test, a whole surface of the wafer is covered with an electric conductive film for preventing the charge of static electricity. Therefore, the electric conductive film is removed by ion milling after the examination of the write-core width of the core section.

The ion milling is applied to the whole surface of the wafer so as to remove the electric conductive film for executing the SEM test. In the case of having the write-core width 1 µm or more, variation of the write-core width caused by ion milling is 0.01–0.02 µm, so that variation cause no problems. However, in the thin film magnetic head for the recent magnetic disk drive unit, the write-core width is 0.2 µm or less; the variation of the write-core width badly influences accuracy and function of products, and it cannot be ignored.

SUMMARY OF THE INVENTION

The present invention was invented so as to solve the problem of the conventional thin film magnetic head.

An object of the present invention is to provide a method of manufacturing a thin film magnetic head, which is capable of precisely forming a core section with preventing the variation of the write-core head caused by ion milling for removing an electric conductive film and capable of improving yield of products.

To achieve the object, the present invention has following structures.

Namely, the method of manufacturing a thin film magnetic head, in which a core section having prescribed write-core width is formed by applying ion milling to an upper magnetic pole and a lower magnetic pole, comprises the steps of: examining the write-core width of the core section; covering a surface of the core section with a protection film except an electric conductive film for preventing electro static charge of a wafer; and removing the exposed electric conductive film by ion milling.

In the method, the protection film may be made of photo resist; the protection film may be removed after the electric conductive film is removed by ion milling; and the photo resist may be heated and cured after the surface of the core section is covered with the protection film, and the electric conductive film is removed by ion milling after the photo resist is cured. Preferably, the protection film is cured at temperature of 250° C. or less so as to prevent deterioration of an MR element caused by high temperature.

Preferably, a whole surface of the wafer is covered with an inorganic oxide after the core section is formed, then the electric conductive film is exposed by lift-off and the surface of the core section is covered with the protection film, then the electric conductive film is removed by ion milling; or a whole surface of the wafer is covered with an inorganic nitride after the core section is formed, then the electric conductive film is exposed by lift-off and the surface of the core section is covered with the protection film, then the electric conductive film is removed by ion milling. For example, alumina may be used as the inorganic oxide, and silicon nitride may be used as the inorganic nitride.

Further, a magnetic recording-reproducing apparatus of the present invention includes: a thin film magnetic head manufactured by the method of the present invention; and a magnetic recording medium.

In the method of the present invention, when the electric conductive layer for preventing electric charge is removed by ion milling after forming the core section having the prescribed write-core width, the core section is covered with the photo resist, the inorganic oxide, etc. and ion-milled. Therefore, the write-core width can be precisely controlled without variation thereof; and the thin film magnetic heads having write-heads, which have excellent recording characteristics and which is capable of recording data with high recording density, can be manufactured with good yield.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

FIGS. 1A–1D are explanation views showing steps of the method of manufacturing the thin film magnetic head of a first embodiment.

Figure 1A:
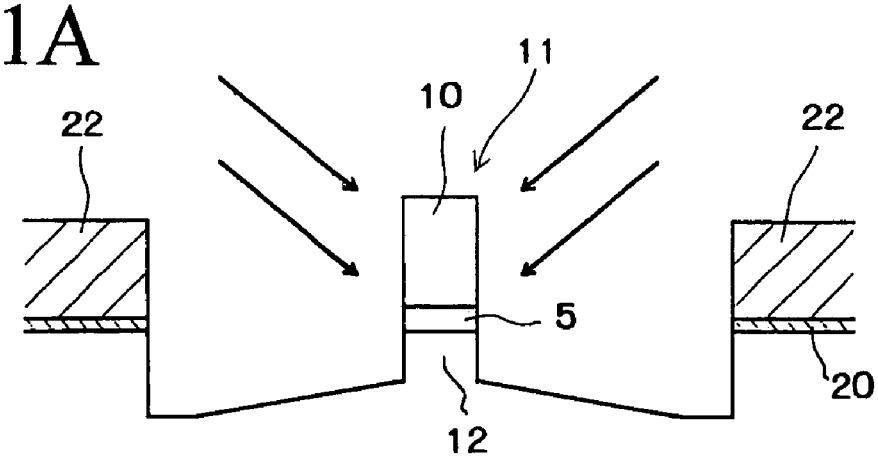
FIGS. 1A–1D are explanation views showing steps of the method of manufacturing the thin film magnetic head of a first embodiment.

In FIG. 1A, a core section 11 having prescribed write-core width is formed by ion milling after an upper magnetic pole 10 is formed. Photo resist 20 acts as a protection film for protecting an electric conductive film 20. The electric conductive film 20 is formed so as to prevent electric charge of a wafer while an examination of the write-core width, e.g., SEM test.

To control the write-core width, firstly the upper magnetic pole 10 and a lower magnetic pole 12 are ion-milled so as to determine write-width of the magnetic poles 10 and 12, and side faces of a core section 11 of the lower magnetic pole 12 are simultaneously curved by ion-milling. With this step, the core section 11 is formed into a rectangular shape, as shown in FIG. 1A, in which a write gap 5 is formed between the magnetic poles 10 and 12.

The examination of the write-core width is executed by examining the sectional shape of the core section 11 by the SMI or SME test after the photo resist 22 is removed. A plurality of the thin film magnetic heads are formed in the wafer, so conditions of the ion milling are varied according to their positions. The examination examines if the write-core width of each magnetic head is in a standard range or not.

Figure 1B:
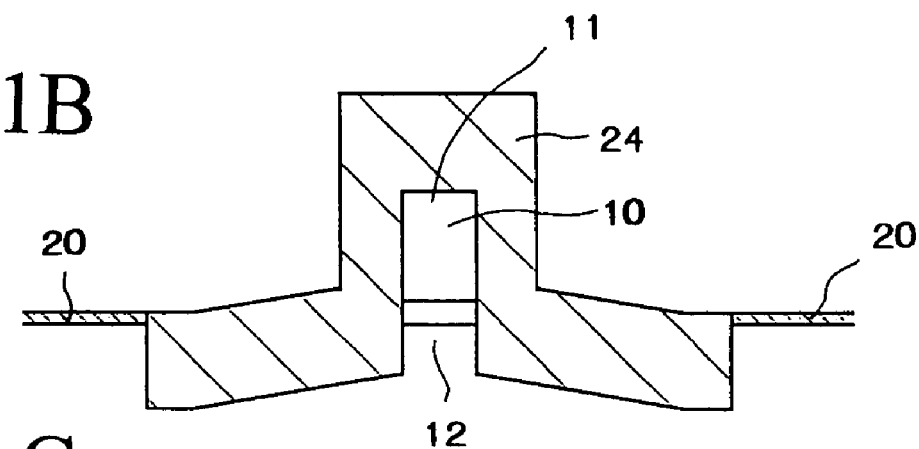

In FIG. 1B, exposed parts of the magnetic poles 10 and 12 are covered with photo resist 24 so as to remove the electric conductive layer 20 after the examination. When the electric conductive layer 20 is removed by ion milling, the photo resist 24 covers the core section 11 of the magnetic poles 10 and 12 so as to protect the core section 11 from the ion milling for removing the electric conductive layer 20. The photo resist 24 is patterned on the wafer so as to cover the core section 11 of the magnetic poles 10 and 12 and expose the electric conductive layer 20.

Figure 1C:
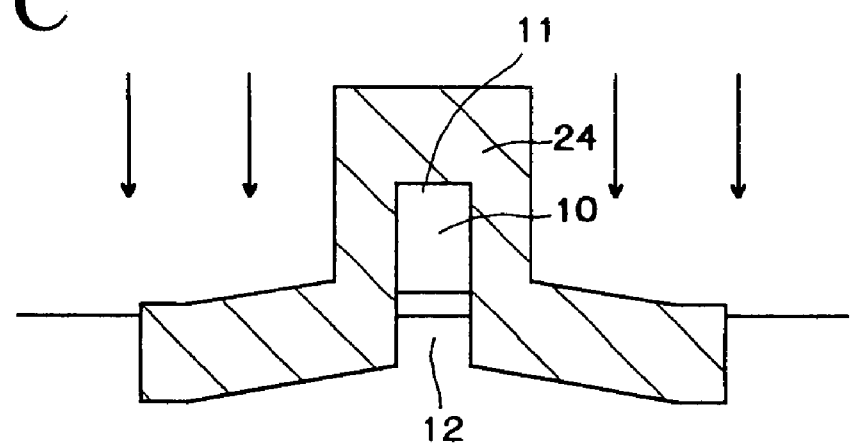

In FIG. 1C, the core section 11 of the magnetic poles 10 and 12 are covered with the photo resist 24, and the electric conductive layer 20 is removed by ion milling.

Figure 1D:
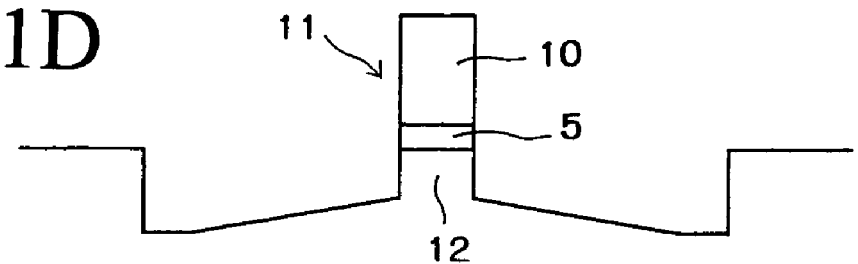

In FIG. 1D, the photo resist 24 covering the core section 11 of the magnetic poles 10 and 12 is removed, and the core section 11 of the magnetic poles 10 and 12 is finally exposed. By removing the electric conductive layer 20, by ion milling, with the magnetic poles 10 and 12 covered with the photo resist 24, the examined write-core width can be maintained without the variation of the write-core width caused by ion milling, so that the thin film magnetic head having the prescribed write-core width can be manufactured.

FIGS. 2A–2D are explanation views showing steps of the method of manufacturing the thin film magnetic head of a second embodiment. The structural elements shown in FIGS. 1A–1D are assigned the same symbols and explanation will be omitted.

Figure 2A:
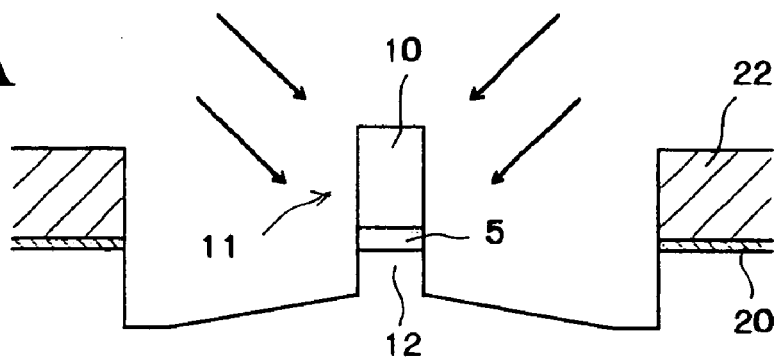
FIGS. 2A–2D are explanation views showing steps of the method of manufacturing the thin film magnetic head of a second embodiment.

In FIG. 2A, a surface of the electric conductive film 20 has been covered with the photo resist 22, and the lower magnetic pole 12 is curved by ion milling so as to form the core section 11 of the magnetic poles 10 and 12.

Figure 2B:
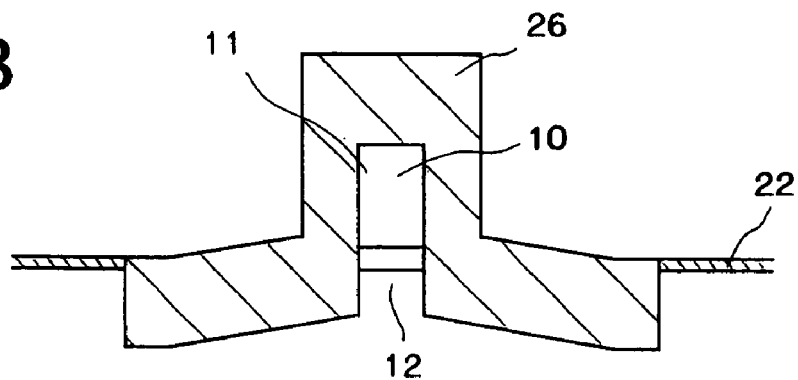
Figure 2C:
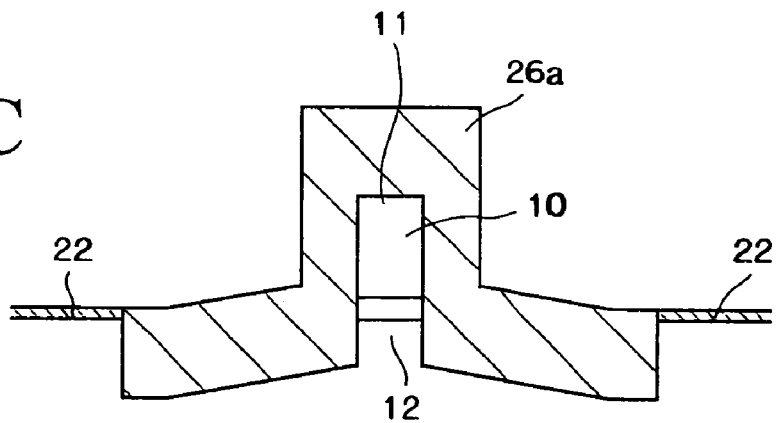

In FIG. 2B, the photo resist 22 has been removed so as to remove the electric conductive film 20 by ion milling, then exposed faces of the magnetic poles 10 and 12 are covered with photo resist 26.

In the second embodiment, the photo resist 26 covering over the magnetic poles 10 and 12 is heated to cure the photo resist 26. The photo resist 26 is cured at, for example, 250° C. The curing temperature of the photo resist is not limited, but the preferable curing temperature is 250° C. or less so as not to damage the MR element, etc.

By heating and curing the photo resist 26, the core section 11 of the magnetic poles 10 and 12 is covered with the cured photo resist 26a, so that the cured photo resist 26a is not peeled from the core section 11 of the magnetic poles 10 and 12.

Figure 2D:
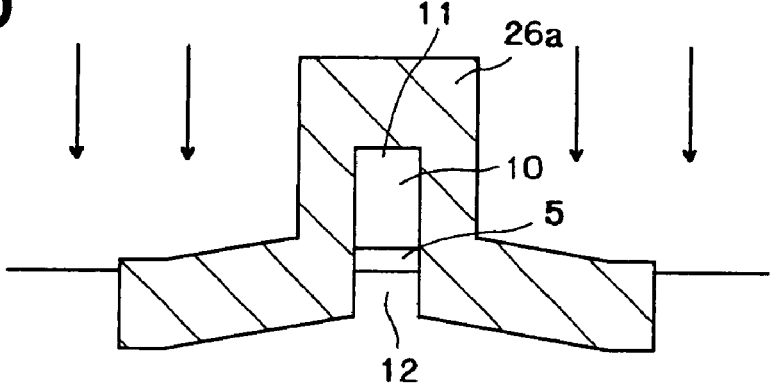

In FIG. 2D, the magnetic poles 10 and 12 have been covered with the cured photo resist 26a, and the electric conductive film 20 is removed by ion milling. In the present embodiment, the core section 11 of the magnetic poles 10 and 12 of the completed thin film magnetic head is covered with the cured photo resist 26a.

In the present embodiment too, the magnetic poles 10 and 12 are covered with the cured photo resist 26a, the examined write-core width can be maintained without the variation of the write-core width caused by ion milling, so that the thin film magnetic head having the prescribed write-core width can be manufactured.

Further, since the core section 11 of the magnetic poles 10 and 12 is protected by the cured photo resist 26a, the core section 11 can be securely protected in the following steps, e.g., film-forming step, patterning step.

FIGS. 3A–3E are explanation views showing steps of the method of manufacturing the thin film magnetic head of a second embodiment. The structural elements shown in FIGS. 1A–2D are assigned the same symbols and explanation will be omitted.

Figure 3A:
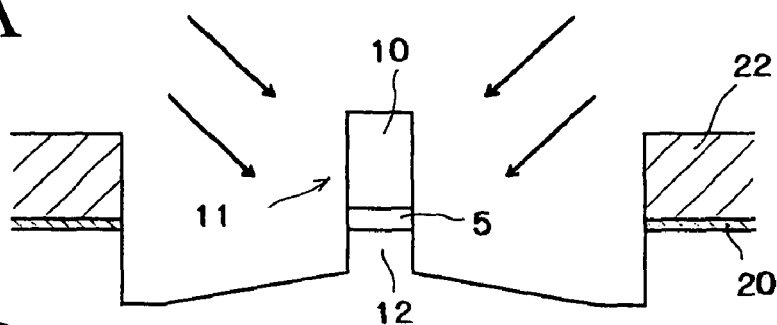
FIGS. 3A–3E are explanation views showing steps of the method of manufacturing the thin film magnetic head of a third embodiment.

In FIG. 3A, the core section 11 is formed in the magnetic poles 10 and 12 by ion milling as well as the foregoing embodiments.

Figure 3B:
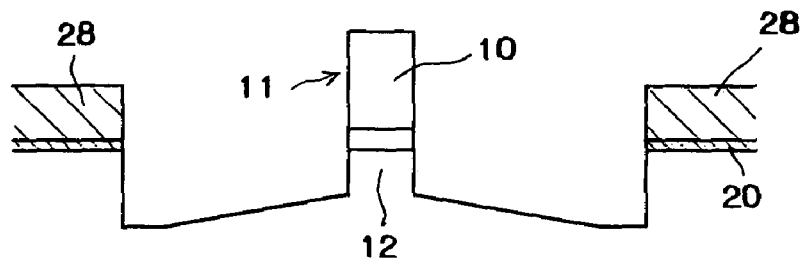

In FIG. 3B, the surface of the wafer other than the core section 11 is covered with photo resist 28. The photo resist 28 will be dissolved in the following step.

Figure 3C:
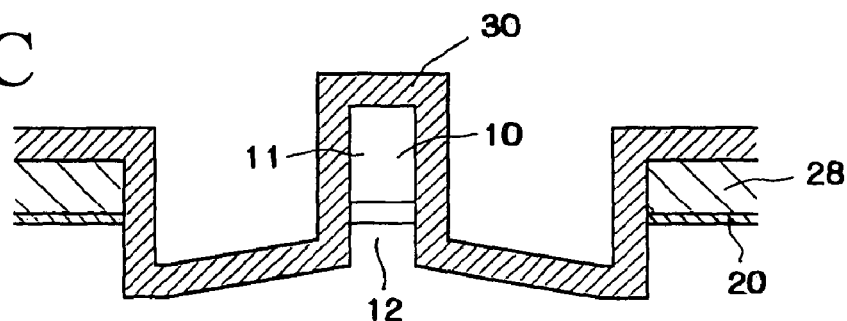

In FIG. 3C, the whole surface of the wafer is covered with an alumina film 30, which is formed by spattering, after the surface of the wafer other than the core section 11 is covered with photo resist 28. Thickness of the alumina film 30 may be about 1.0 µm.

Figure 3D:
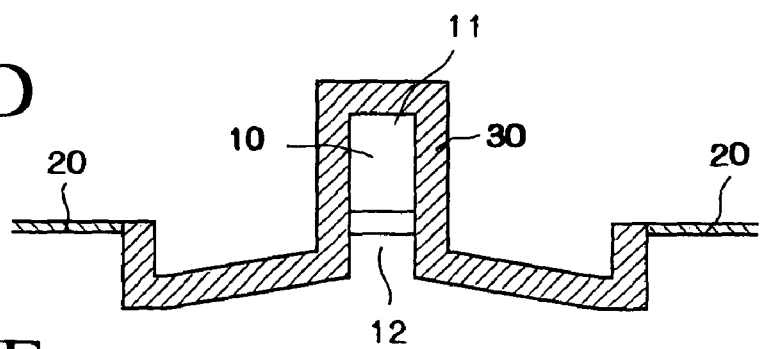

In FIG. 3D, after the alumina film 30 is formed, the photo resist 28 is selectively dissolved so as to remove the photo resist 28 from the surface of the electric conductive film 20. And, the alumina film 30 covering the photo resist 28 is lifted off. The lift-off is executed by chemical dissolution or supersonic cleaning.

Figure 3E:
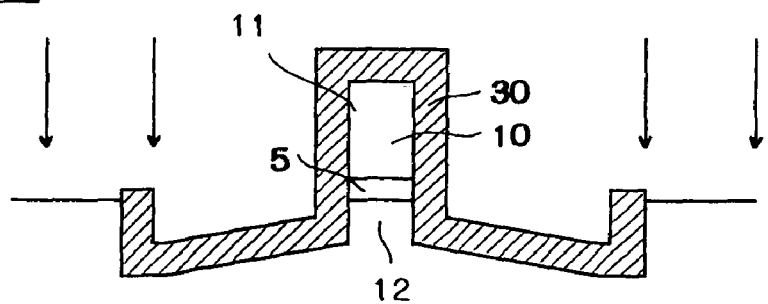
Figure 4:
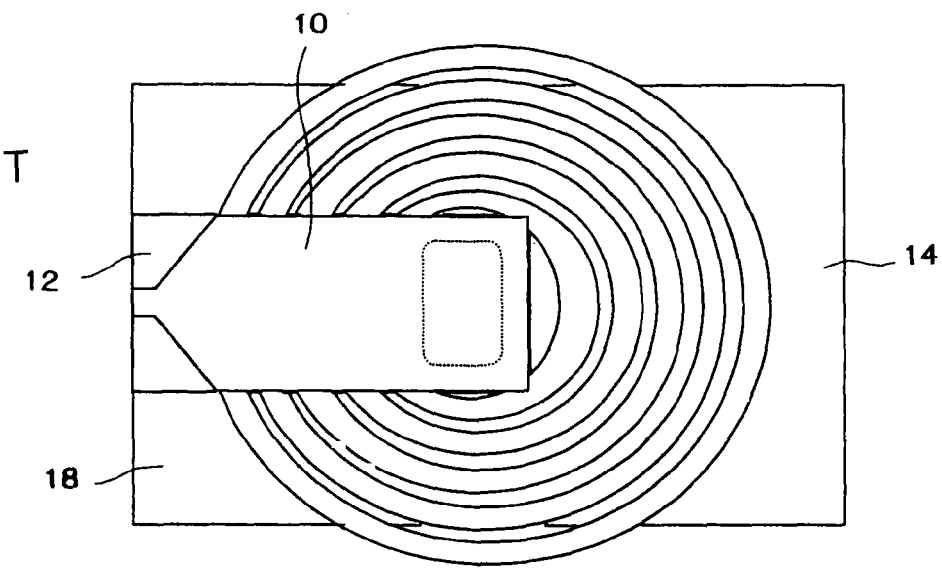
FIG. 4 is a plan view of the ordinary thin film magnetic head.
Figure 5:
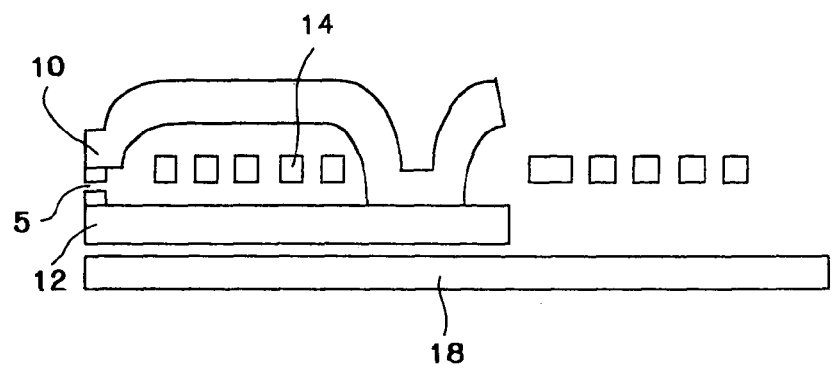
FIG. 5 is a sectional view of the ordinary thin film magnetic head.
Figure 6:
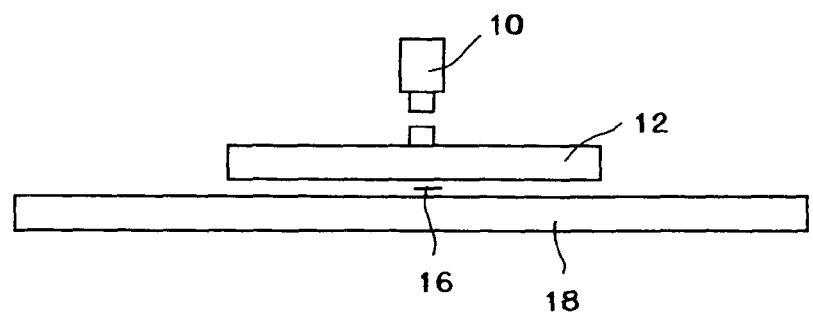
FIG. 6 is an explanation view of the disk-side face of the ordinary thin film magnetic head.

In FIG. 3E, the exposed electric conductive film 20 is removed by ion milling. The core section 11 of the magnetic poles 10 and 12 is covered with the alumina film 30, and it can be protected from the ion milling, so that the electric conductive film 20 only is removed.

In the present embodiment, the core section 11 of the magnetic poles 10 and 12 of the completed thin film magnetic head is covered with the alumina film 30 as shown in FIG. 3E.

In the present embodiment too, the magnetic poles 10 and 12 are covered with the alumina film 30, the examined write-core width can be maintained without the variation of the write-core width caused by ion milling, so that the thin film magnetic head having the prescribed write-core width can be manufactured.

Note that, an inorganic oxide, e.g., alumina, and an inorganic nitride, e.g., silicon nitride, can be used as the material for covering and protecting the core section 11. The thickness of the film for covering and protecting the core section 11 may be optionally selected from a range of 0.1–2.0 µm.

In the third embodiment, the photo resist 28, which is separately used from the photo resist 22 for ion-milling the core section 11, is used so as to lift off the alumina film 30. In other cases, the photo resist 22 may be used for lifting off a covering film.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A method of manufacturing a thin film magnetic head, comprising the steps of:

forming an upper magnetic pole and a lower magnetic pole separated by a write gap on a wafer;

forming an electric conductive film, which prevents electrostatic charge of said wafer;

covering said wafer with a protection film except a part in which a core section will be formed;

forming said core section in said part by ion milling, said core section having a prescribed write-core width formed by applying ion milling to said upper magnetic pole and said lower magnetic pole;

removing said protection film;

examining said core section;

covering said core section with another protection film;

removing said electric conductive film; and removing said protection film from said core section.

2. The method according to claim 1, wherein said protection films are made of photo resist.

* * * * *

UNITED STATES PATENT AND TRADEMARK OFFICE
CERTIFICATE OF CORRECTION

| | | |
|---|---|---|
| PATENT NO. | : 7,219,415 B2 | Page 1 of 1 |
| APPLICATION NO. | : 10/631624 | |
| DATED | : May 22, 2007 | |
| INVENTOR(S) | : Kakehi | |

It is certified that error appears in the above-identified patent and that said Letters Patent is hereby corrected as shown below:

On title page Item [57]
<u>In the Abstract</u>:

Line 8, delete "of examining" and insert --of: examining--.

Signed and Sealed this

Twenty-fifth Day of September, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,219,415 B2 | Page 1 of 1 |
| APPLICATION NO. | : 10/631624 | |
| DATED | : May 22, 2007 | |
| INVENTOR(S) | : Masahiro Kakehi | |

It is certified that error appears in the above-identified patent and that said Letters Patent is hereby corrected as shown below:

On the Title Face:

Item [30] Under "Foreign Application Priority Data", delete "May 8, 2002" and insert --August 5, 2002--.

Signed and Sealed this

Fourth Day of December, 2007

JON W. DUDAS
*Director of the United States Patent and Trademark Office*